Jan. 19, 1943.  C. IVERSON ET AL  2,308,977
VULCANIZING PRESS
Filed Feb. 17, 1939  6 Sheets-Sheet 1

INVENTOR
CATO IVERSON, AND
WILLIAM A. MAGERKURTH

BY
*J. Ralph Barrow*
ATTORNEY

Jan. 19, 1943.   C. IVERSON ET AL   2,308,977
VULCANIZING PRESS
Filed Feb. 17, 1939   6 Sheets-Sheet 3

INVENTOR
CATO IVERSON, AND
WILLIAM A. MAGERKURTH
BY
Ralph Barrow,
ATTORNEY

Jan. 19, 1943.   C. IVERSON ET AL   2,308,977
VULCANIZING PRESS
Filed Feb. 17, 1939   6 Sheets-Sheet 4

INVENTOR
CATO IVERSON, AND
WILLIAM A. MAGERKURTH

BY

*Ralph Barrow*

ATTORNEY

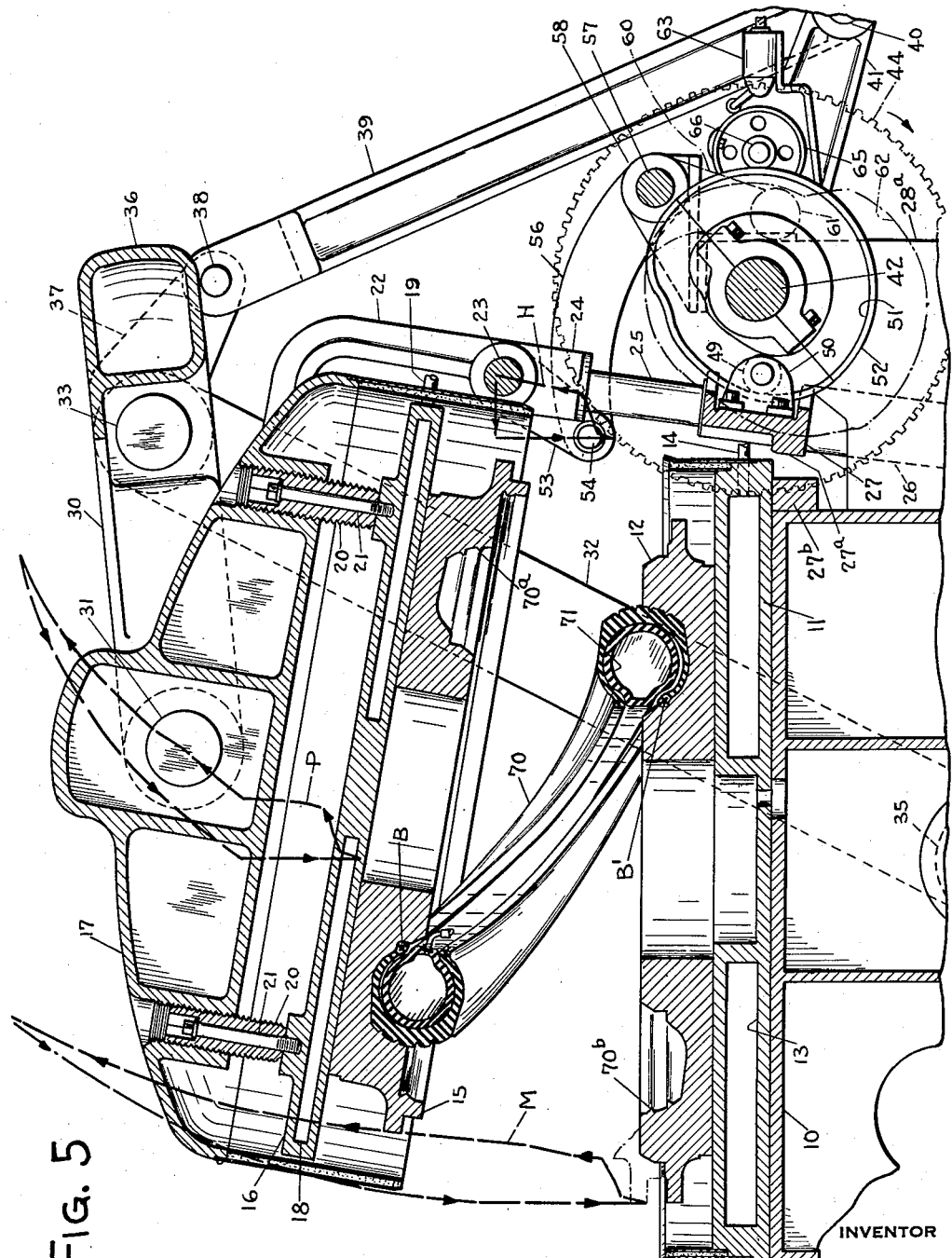

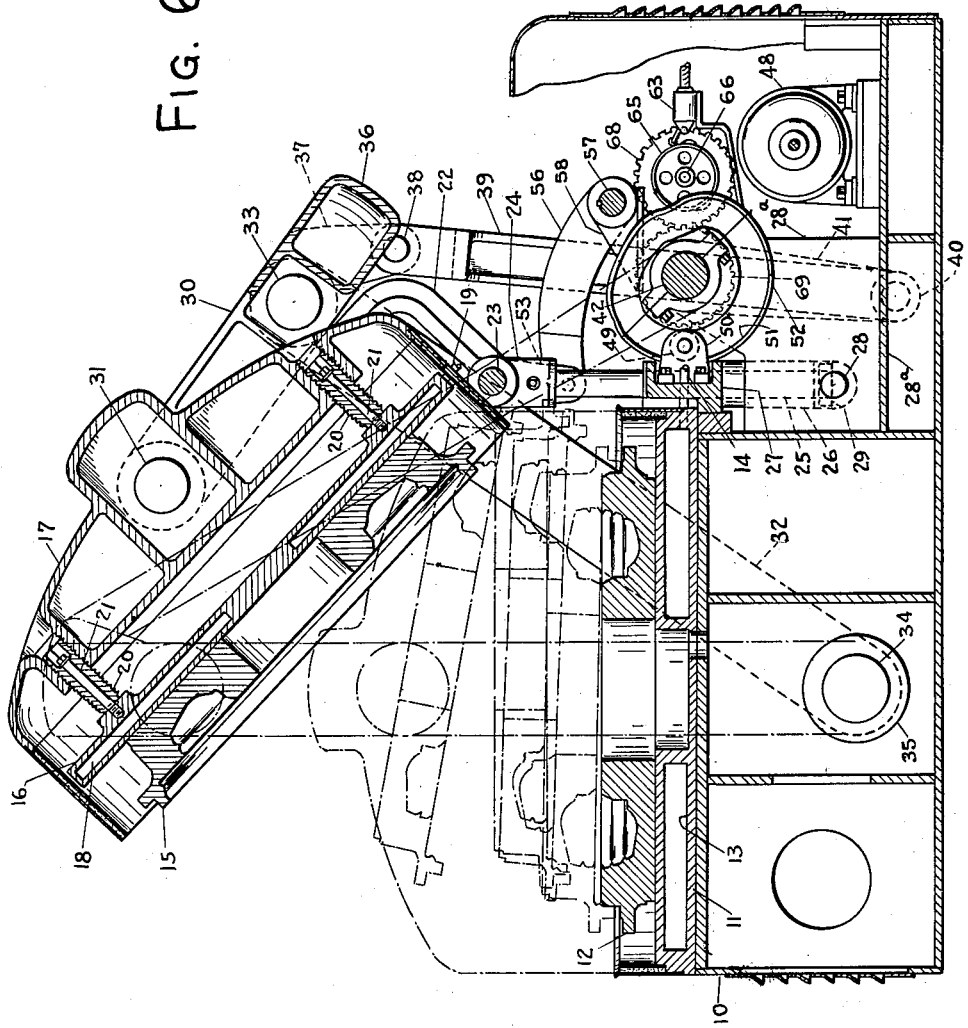

Patented Jan. 19, 1943

2,308,977

UNITED STATES PATENT OFFICE 2,308,977

VULCANIZING PRESS

Cato Iverson and William A. Magerkurth, Akron, Ohio, assignors to National Rubber Machinery Company, Akron, Ohio, a corporation of Ohio Application February 17, 1939, Serial No. 256,950

9 Claims. (Cl. 18—17)

This invention relates to vulvanizing presses, and relates particularly to vulcanizing presses or molds for the production of pneumatic tires or similar articles.

A general object of the invention is to provide in vulcanizers of the character described improved means for opening and closing the same.

A particular object of the invention is to provide in vulcanizing presses of the character described improved means for stripping articles from the press after vulcanization, the same being accomplished by relative movement of the mold sections of the press.

Another object of the invention is to provide a hinge type vulcanizing press having a pair of registering mold sections, from which a cured tire or like article may be stripped from both sections by the opening movement thereof without damaging or blemishing the article.

Another object of the invention is to provide a vulcanizing press of the character described in which the relative opening movement of the registering mold sections is such that a tire or similar article effectively is stripped from said sections in a manner which obviates the usual practice of lubricating one or both of the mold cavities.

These and other objects of the invention will be manifest from the following brief description and the accompanying drawings.

Of the accompanying drawings:

Figure 5 is a fragmentary cross-section on an enlarged scale, taken substantially on line 5—5 of Figure 1, but with the press mechanism shown in an intermediate opening condition, the paths of certain points on the upper mold half during the opening and closing movement thereof being shown diagrammatically.

Figure 6 is a view similar to Figure 5 showing the press in the fully open condition.

Figure 1:
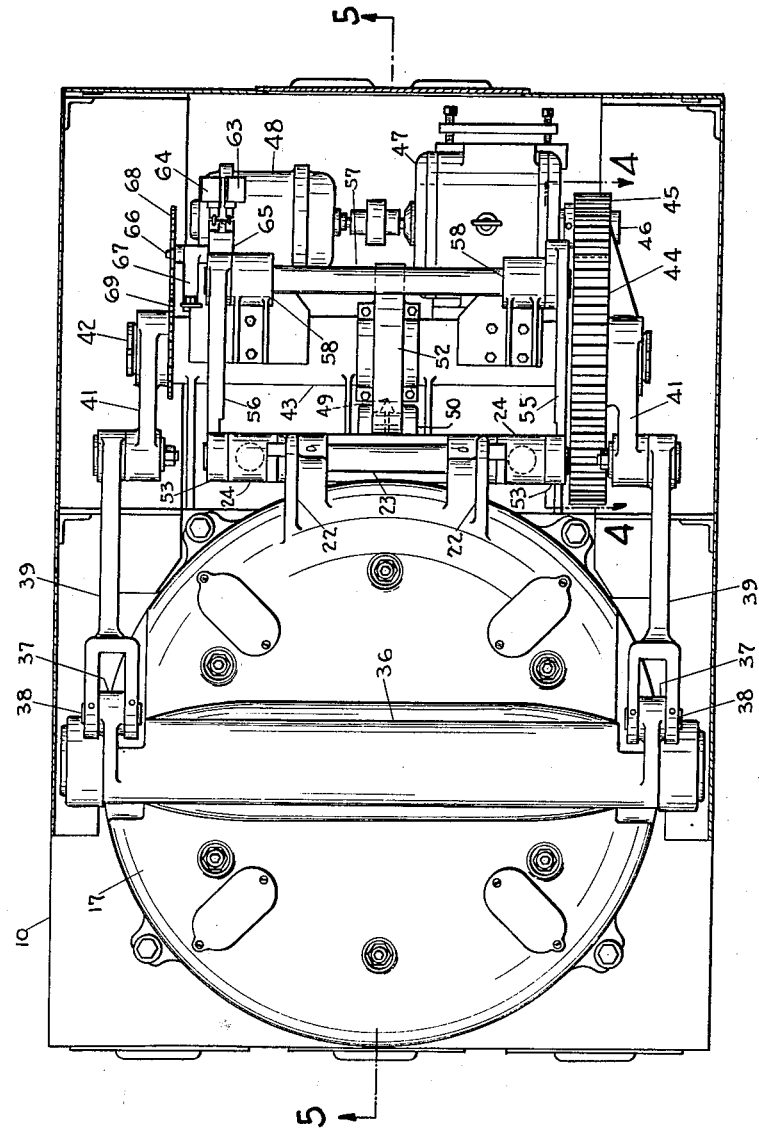
Figure 1 is a plan view, partly broken away and in section of a closed tire-vulcanizing press embodying the invention.

Referring to the drawings, the numeral 10 may designate a suitable housing which supports a lower platen 11 having secured thereon a lower mold section 12, the former preferably being chambered at 13 for circulation of steam or other heat-vulcanizing medium, supplied through piping 14, 14, for heating mold section 12. An upper mold section 15, adapted to be in registry with lower mold section 12 when the press is closed, may be carried by an upper platen 16 preferably adjustably secured to an upper press-head 17. Platen 16 may be suitably chambered at 18 for circulation of heating medium, through flexible conduits 19, 19, to heat the upper mold section 15.

For adjusting platen 16 on press-head 17, a plurality of pins 20, 20, threaded in the press-head have bores therein for receiving headed bolts 21, 21 threaded in platen 16, the arrangement being such that platen 16 carrying mold section 15 may be drawn firmly against the lower faces of the pins 20. Pins 20 are adapted to be adjusted in press-head 17 by means of a suitable wrench (not shown). This permits adjusting the platens toward or away from each other to receive molds of different sizes.

Press-head 17 may have at the rear thereof a pair of hinge-brackets 22, 22 having a hinge pin 23 secured therein, for pivotally mounting the head 17 on hinge-blocks 24, 24. Blocks 24 may be carried on the upper ends of a pair of rods 25, 25 vertically shiftable in bosses 26, 26 of a suitable bracket 27, pivotally mounted at the lower end thereof on pins 28, 28 secured in a supporting frame 28ª mounted in housing 10. Collars 29, 29 may be provided on the lower ends of the rods to limit upward movement thereof. Bracket 27 may have a forwardly projecting portion 27ª adapted to abut a block 27ᵇ, secured on housing 10, when the bracket is in vertical position to hold the press members in alignment.

Figure 2:
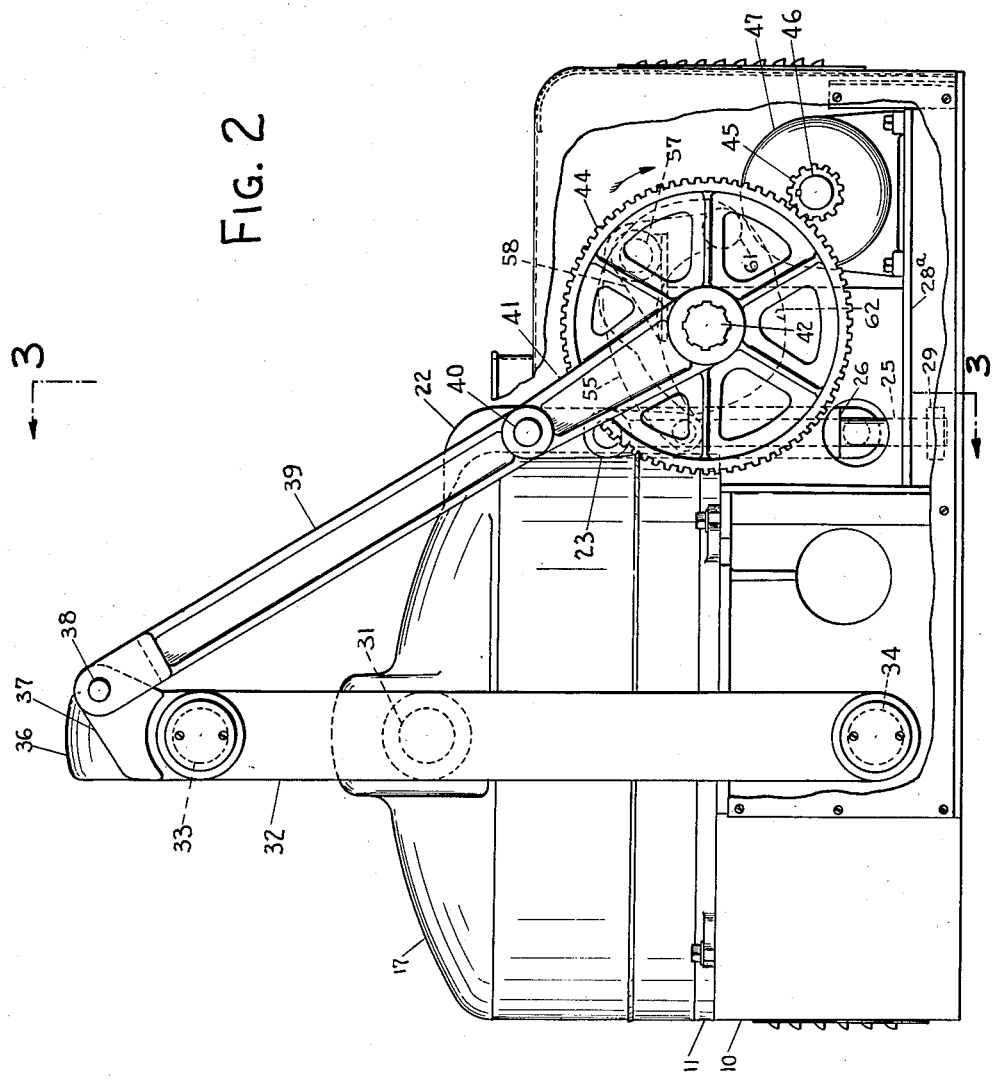
Figure 2 is an end elevation, partly broken away and in section, as viewed from the right of Figure 1.
Figure 3:
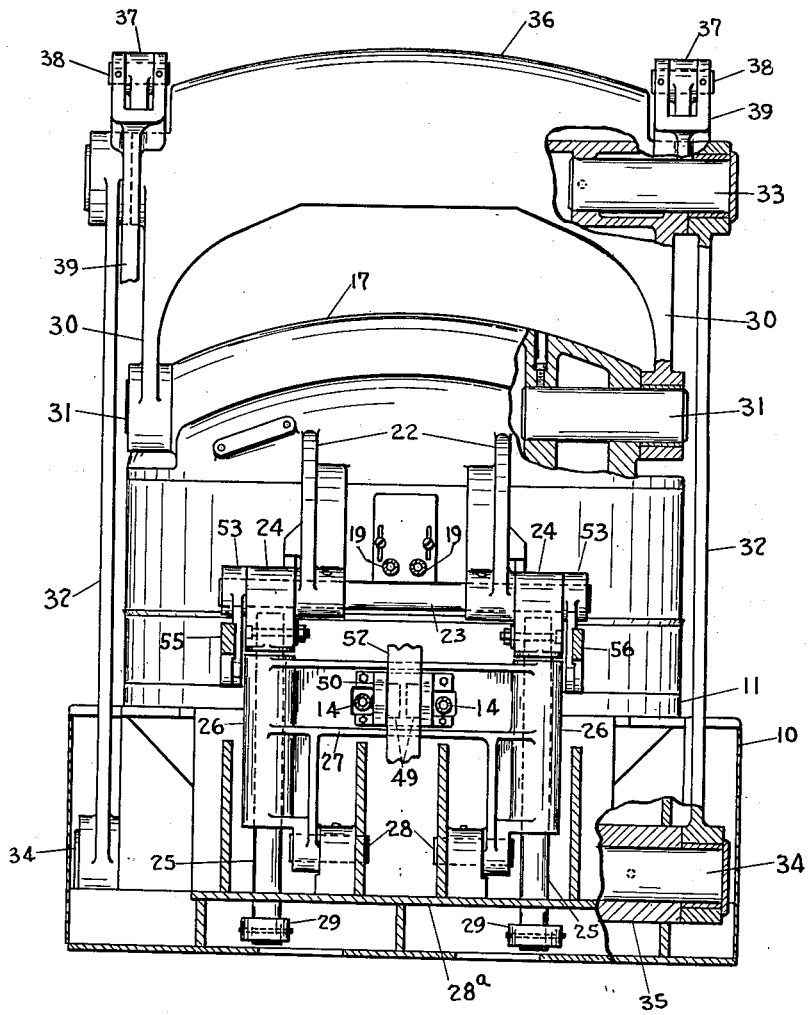
Figure 3 is a cross-section, partly broken away and in section, taken substantially on line 3—3 of Figure 2.

As best shown in Figures 1, 2 and 3, a toggle mechanism may be provided for swinging press-head 17 on the hinge pin 23. This may comprise a pair of upwardly extended, relatively short, links 30, 30 pivotally connected at opposite sides of the press-head 17 to pins 31, 31 and a pair of relatively long links or side arms 32, 32 pivotally connected at one end thereof to pins 33, 33, fixed in the free ends of links 30, said links 32 extending downwardly to be pivotally connected to pins 34, 34, fixed in brackets 35 in housing 10. Links 30 preferably are integrally joined by means of a cross-beam 36.

For collapsing and extending the toggle mechanism, to open and close the press, links 30 may be provided with upwardly extending lugs 37, 37 to which are pivotally connected, by means of pins 38, 38, one end of pitmans 39, 39 pivotally connected at their other ends to pins 40, 40 in the free ends of crank-arms 41. The crank arms 41 may be splined on a common shaft 42 journalled in a bearing member 43 at the rear of the press, shaft 42 being driven by a gear 44 thereon, meshing with a pinion 45 on a shaft 46, in turn driven, through a reduction gearing 47, by a motor 48. Although motor 48 is of the reversing type, it preferably is operable so that gear 44 in making one revolution in a clockwise direction, as viewed in Figure 2, completes an opening and closing cycle. Motor 48 may be provided with a suitable magnetic brake (not shown), automatically to stop the motor when electric power thereto is cut off. The arrangement is such that motor 48 may be started to rotate shaft 42 in a clockwise direction to swing crank-arms 41 from position thereof shown in Figure 2 to the fully open position shown in Figure 6, crank-arms 41 thereby operating pitmans 39 to pull downwardly on lugs 37 and collapse the toggle links 30 and 32. This causes the press-head 17 to swing on its hinged connection 23 on hinge blocks 24.

To provide for the desired movements of the upper press-head 17, later to be described, the bracket 27 has associated therewith a pair of rollers 49, 49 engaged with a double cam 52, for swinging bracket 27 on pins 28, and hinge-pin 23 is vertically shiftable by links 53 pivoted at 54 to arms 55 of a bell-crank which is fixedly pivoted at 57, and said bell-crank 59 having an arm 60 on the free end of which is roller 61 engaged with a cam 62, whereby the cooperative action of cams 52 and 62 cause the hinge-pin 23 to follow a predetermined path during the opening and closing movements of the press, the cam 52 causing bracket 26 to swing forwardly and rearwardly of the press, carrying with it the hinge-pin 23, and cam 62 causing the hinge-blocks 24 to raise and lower vertically of the press.

Figure 4:
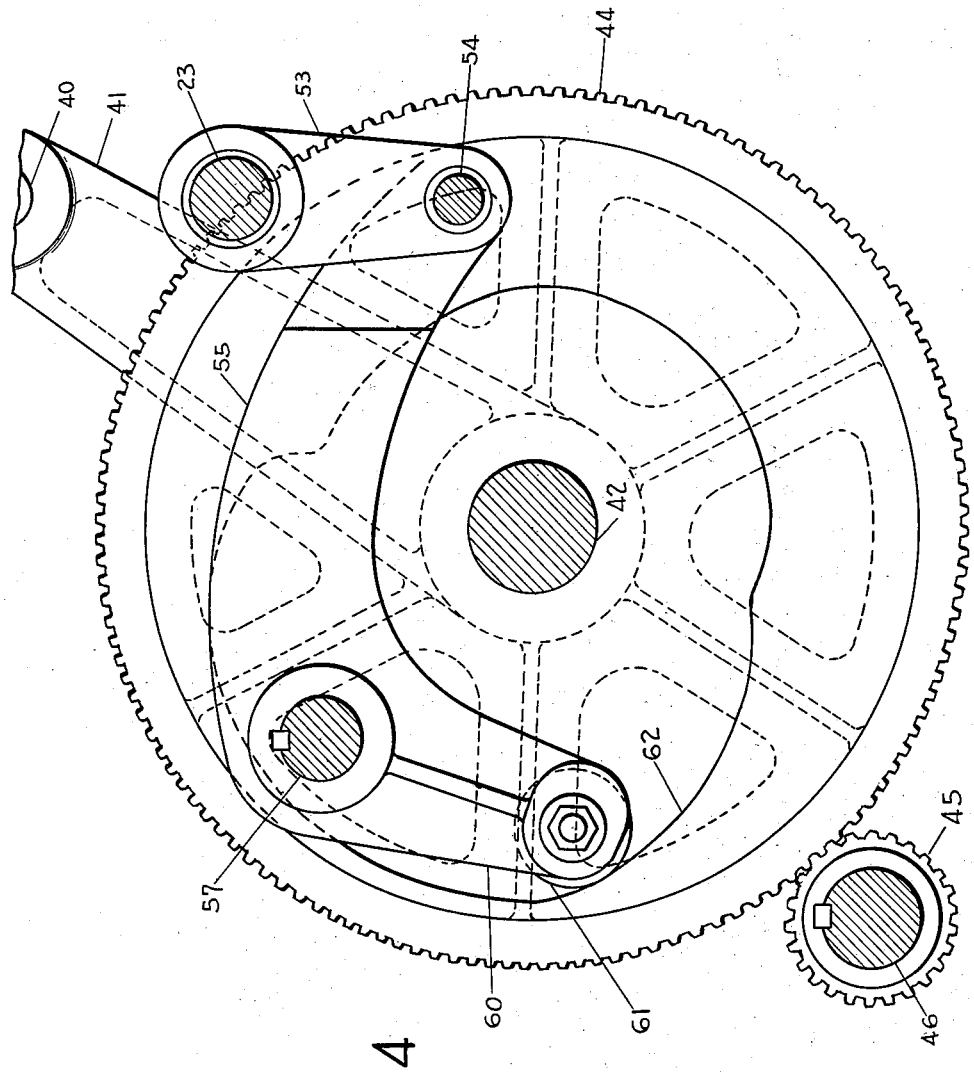
Figure 4 is a cross-section taken substantially on line 4—4 of Figure 1, as viewed from the rear thereof.

Rollers 49 may be mounted on lugs 50, 50, on the rear face of bracket 27, for rolling engagement in suitably shaped double-acting cam grooves 51 on opposite sides of the double acting cam 52 secured on shaft 42. For vertically shifting the rods 25 in bosses 26 of bracket 27, during swinging of the bracket 27, to obtain the required movement of the upper press-head, cam 62 may be provided as a cam surface on the inside of gear 44 so that cams 52 and 62 rotate together with shaft 42. Cam surface 62 preferably is shaped, substantially as shown in Figure 4, progressively to cause hinge-pin 23 to be lifted, as it is laterally shifted by the action cam 52 and its associated parts, to guide the hinge-pin vertically and horizontally along a resultant path to be described.

Limit switches 63 and 64, suitably supported on frame 28ª, may be arranged to be actuated by a double cam 65 to stop motor 48 in the closed and fully open positions, respectively. Cam 65 preferably is mounted on a shaft 66, journalled in a bearing 67 supported on frame 28ª, shaft 66 being driven by a gear 68 thereon meshing with a gear 69 keyed on shaft 42.

In operation of the press, after the usual curing cycle during which time the press is in the closed condition, shown in Figure 2, with a tire 70 and pressure bag 71 therein, an operator may press a push-button (not shown) to close the motor circuit, or if the press is time-controlled the time controller will close the motor circuit to open the press, as will be understood by skilled artisans, collapsing the toggle links 39 and 41 and thereby swinging press-head 17 on hinge-pin 23 to swing the press-head, carrying upper mold section 15, toward the fully open position thereof shown in Figure 6. While press-head 17 is being swung from the closed position, to the open position shown in Figure 6, cams 52 and 62 simultaneously are actuated to move hinge-pin 23 progressively upwardly and rearwardly, as best shown by the chain-dotted intermediate position of the upper mold-section, as indicated in Figure 6, and by the diagrams H, P, and M in Figure 5. As shown in Figure 5, the hinge-pin 23 follows the path H from the lowermost point thereof to the upper right hand corner of path H, in which position pin 23 will be when the upper mold 15 is in the position shown in Figure 5, and as the upper mold 15 is swung from the intermediate position of Figure 5 to the fully open position of Figure 6, hinge-pin 23 is shifted from the upper right hand corner of diagram H to the left hand corner thereof, in which position hinge-pin 23 assumes in the fully open position of the press as shown in Figure 6.

By reason of the action of the toggle 30, 32 on the upper press-head 17, this press-head at its pivot 31 is caused to follow the path P, shown in Figure 5, whereby when the press is closed the pivot 31 is at the lowermost point of the diagram P and follows this diagram upwardly and rearwardly along the path P, assuming the intermediate position shown in Figure 5, and moving to the uppermost point of the path P as the pivot pin 23 is swung forwardly until the pin 23 and the pivot 31 assume the position of the fully open press as shown in Figure 6. The front edge of the upper mold 15, during the opening movement of the press follows the path or diagram M, swinging upwardly and rearwardly about the pivot 23 in its forward position, as shown in Figure 2, until the register of mold-section 15 with mold section 12 has been cleared, and then continuing to swing upwardly while pivot 23 is moved rearwardly and upwardly, so that the upper mold 15 will be at first shifted rearwardly of the lower mold 12 to exert stripping pressure on the front portions of the tire 70 to free it from the lower mold, and so as to exert stripping pressure on the rear side of tire 70 by the lower mold section 12 to strip the rear portion of the tire 70 from the upper mold, the combined swinging and transverse movement of the upper mold section rearwardly of the lower mold section thus causing a progressive stripping of the tire from the lower mold from the front toward the rear of the press, and progressive stripping of the tire from the upper mold from the rear toward the front of the press.

This causes the press to be self stripping, whereby upon continued opening of the press, from position shown in Figure 5, to the position shown in Figure 6, the tire snaps free from the mold. The cams 52 and 62 are so designed that the upper mold, by lifting of pivot 23 during the opening swinging, is caused to approach a parallel position with respect to the lower mold, as indicated by the chain-dotted line intermediate positions shown in Figure 6, as the mold is swung from the closed position to intermediate position shown in Figure 5. This allows the beads B and B¹, which have become contracted by the swinging action of the upper mold sections to spread and release themselves from the bead molding surfaces of the mold sections, so that as the press continues to open from the position shown in Figure 5 the tire will fall free of both molds. In swinging from the intermediate position in Figure 5 to the fully open position of Figure 6, the upper mold 15 follows the path M to the uppermost point thereof.

The tire which has fallen freely on the lower mold section is now removed from between the mold sections together with the enclosed pressure-bag 71. The attendant dusts the mold-sections 12 and 15 with soapstone or the like and then places in the lower mold a raw or unvulcanized tire together with its enclosed pressure bag, as will be understood by skilled artisans, the usual pressure connection being made to the pressure bag. Whereupon the operator presses the usual starter button (not shown) causing motor 48 to be driven to close the press.

It will be understood that the closing and opening of the press is effected principally by the cranks 41 and pitmans 39 acting on the toggles 30, 32. This is a long well known press operating mechanism.

Upon closing of the press, cams 52 and 62 are so designed that hinge-pin 23 remains in its upper forward position, left hand corner of diagram H, until the press-head 17 swings to a position parallel with the lower press platen 10, the pivots 31 following the upper curvilinear portion of the path P, and the outer edges of the upper mold section 15 following the upper curvilinear portion of the path M from the uppermost points of these paths during this portion of the closing movement. Thereafter and while the upper mold section 15 is aligned with the lower mold section 12, and parallel thereto, the upper mold is carried by press-head 17 vertically and downwardly into mating relation with the lower mold member 12, the pin 23, the pin 31, and the outer edge of the mold section 15, following the parallel vertical portions of the paths H, P and M, respectively, as appears at the left of each of the diagrams H, P and M. Thus the molds move together in parallelism about a tire placed in the lower mold to avoid pinching any portion of the tire between the mold halves. It will be understood that pressure will be applied to the pressure bag 71 in the usual manner, and that the raw tire placed in the vulcanizer will remain in the heated mold until cured, whereupon the opening operations of the press are repeated.

By using a reversing motor at 48 with a suitable reversing switch, it is possible to back up the press-head 17 at any point along its paths between the fully closed and the fully open position to take care of any emergency conditions which may arise.

It has been found that in situations in which it is not desirable to apply transverse stripping action to a vulcanized article, other than a tire, such as a pressure bag of the type indicated by the numeral 71 in Figure 5, the press operating mechanism may be operated in reverse, whereby the pivots 23 and 31, and the front edge of the upper matrix will follow the paths H, P and M, respectively, in directions reverse to that indicated by arrows (see Figure 5). In other words, the press will open with parallel movement of the upper platen so as not to disturb the vulcanized article in the lower matrix. In such case an unvulcanized article in the lower matrix, being of reduced size, will not be affected by the resultant transverse shifting movement of the upper matrix toward closed position.

It is to be understood that the actions of the cams 52 and 62 are such as to shift the position of the hinge-pin 23 laterally and vertically, respectively, either simultaneously or independently to change the angularity of upper mold section 15 in the manner and for the purposes described. Thus, the cam surfaces of cams 52 and 62 may be such as to obtain any desired compound movement of the hinge-pin. This compound movement may be readily changed to suit varying conditions in a specific press, by simply changing or altering the cams or portions thereof.

Modifications of the invention may be resorted to without departing from the spirit thereof or the scope of the appended claims.

What is claimed is:

1. A tire vulcanizing press comprising relatively movable members, each carrying mold-sections adapted to be in registry with each other in the closed position of the press, a shiftable hinge-element about which a first of said members is swingable from and toward the other member, power means for swinging said first member on said hinge-element between closed positions in which the mold-sections are in registering and fully open relatively divergent positions, and means coordinated with operation of said power means to open and close the press for imparting compound motion to said hinge-element to cause said first member to move out of registry with said other member with a relative transverse movement while swinging on said hinge element to intermediate divergent positions and thereafter causing said first member to be swung on said hinge element toward intermediate opening positions approaching parallelism.

2. A tire vulcanizing press comprising relatively movable members, each carrying mold-sections adapted to be in registry with each other in the closed position of the press, a shiftable hinge-element about which a first of said members is swingable from and toward the other member, power means for swinging said first member on said hinge-element between closed positions in which the mold-sections are in registering and fully open relatively divergent positions, and cam operated means including portions for transversely and vertically shifting said hinge-element simultaneously with the swinging of said first member thereon by said power means, whereby said first member is swung apart from said other member first in one direction and then in another direction while shifting transversely of said other member to strip a tire from the mold sections.

3. A tire vulcanizing press comprising relatively movable members, each carrying mold-sections adapted to be in registry with each other in the closed position of the press, a shiftable hinge-element about which a first of said members is swingable from and toward the other member, power means for swinging said first member on said hinge-element between closed positions in which the mold sections are in registering and fully open relatively divergent positions, and cam operated means including portions for transversely and vertically shifting said hinge-element simultaneously with the swinging of said first member thereon by said power means, whereby said first member is swung apart from said other member first in one direction angularly thereof and then in reversed angular direction while shifting transversely of said other member to strip a tire from the mold sections, said cam operated means including portions for shifting said hinge-element thereafter to cause said first member to be swung on said hinge-element to fully open position in said first angular direction.

4. A tire vulcanizing press comprising relatively movable members, each carrying mold sections adapted to be in registry with each other in the closed position of the press, a shiftable hinge-element about which a first of said members is swingable from and toward the other member, power means for swinging said first member on said hinge-element between closed positions in which the mold sections are in registering and fully open relatively divergent positions, and cam operated means including portions for transversely and vertically shifting said hinge-element simultaneously with the swinging of said first member thereon by said power means, whereby said first member is swung apart from said other member first in one direction angularly thereof and then in reversed angular direction while shifting transversely of said other member to strip a tire from the mold sections, said cam operated means including portions for thereafter causing said first member to be swung on said hinge-element to fully open position in said first angular direction, said cam operated means including portions for shifting said hinge-element simultaneously with the closing movement of said first member thereon to cause said first member to be sprung from said fully open position to spaced parallel axially aligned partly closed positions, and thereafter to cause said first member to be moved into registry with said second member while remaining parallel.

5. A tire vulcanizing press comprising relatively movable members, each carrying mold sections adapted to be in registry with each other in the closed position of the press, a support mounted to be transversely shiftable relatively of the press, a hinge-element substantially vertically shiftable on said support, a first of said members being swingable on said hinge-element, means for swinging said first member on said hinge-element between a closed position in which the mold sections are in registry and a fully open position in which the members are in divergent relationship, means for shifting said hinge-element on said support during said swinging movement of said first member, and means for transversely shifting said support either independently or simultaneously with said vertical shifting movement of said hinge element to control the position of the latter and thereby to control the relation of said first member with respect to the other member during said opening and closing movements of the press.

6. A tire vulcanizing press comprising relatively movable members, each carrying mold sections adapted to be in registry with each other in the closed position of the press, a support mounted in association with said member, a hinge-element shiftable relatively of said support, a first of said members being swingable relatively of the other on said hinge-element, means for swinging said first member on said hinge-element between a closed position in which the mold sections are in registry and a fully open position, means for shifting said hinge-element relatively of said support to control the position of the hinge-element during swinging movement of said first member thereon, whereby said first member is swingable out of registry with said other member first in one angular direction and then in a reverse angular direction to strip a tire from the mold sections.

7. A tire vulcanizing press comprising relatively movable members, each carrying mold sections adapted to be in registry with each other in the closed position of the press, a support mounted in association with said sections to be transversely shiftable relative to one of said sections, a hinge-element shiftably mounted on said support to be shiftable relatively thereof in a direction angularly of the transverse shifting of said support, another of said members being swingable on said hinge-element, means for swinging said first member on said hinge-element between a closed position in which the mold sections are in registry and a fully open position in which said sections are in divergent relationship, means for shifting said hinge element relatively of said support, and means for transversely shifting said support in predetermined manner either independently or simultaneously with said relative shifting movement of said hinge element on its support at different stages of the movements of said first member, said first member thereby being swingable out of registry with said other member first in one angular direction and then in a reverse angular direction to strip a tire from the mold sections.

8. A tire vulcanizing press comprising relatively movable members, each carrying mold sections adapted to be in registry with each other in the closed position of the press, a support mounted in association with said sections to be transversely shiftable relative to one of said sections, a hinge-element vertically shiftably mounted on said support, another of said members being swingable on said hinge-element, means for swinging said first member on said hinge-element between a closed position in which the mold sections are in registry and fully open position in which the sections are in divergent relationship, means for vertically shifting said hinge-element relatively of said support, and means for transversely moving said support either independently or simultaneously with said vertical shifting movement of said hinge-element on its support at different stages of the movements of said first member, said first member thereby being swingable out of registry with said other member first in one angular direction and then in a reverse angular direction while shifting said first member transversely of said other member to strip a tire from the mold sections.

9. A tire vulcanizing press comprising relatively movable members, each carrying mold sections adapted to be in registry with each other in the closed position of the press, a support mounted to be transversely shiftable from and toward one side of the press, a hinge-element vertically shiftable on said support, a first of said members being swingable on said hinge-element, means for swinging said first member on said hinge-element between a closed position in which the mold sections are in registry and a fully open position in which the members are in divergent relationship, means for vertically shifting said hinge-element relatively of said support, and means for transversely shifting said support either independently or simultaneously with said vertical shifting movement of said hinge-element on its support at different stages of the movements of said first member, said first member thereby being swingable out of registry with said other member first in one angular direction and then in a reverse angular direction while shifting said first member transversely of said other member to strip a tire from the mold sections, said first member being swingable from fully open positions to spaced parallel axially aligned partly closed positions and thereafter being shiftable into registry with said other member while remaining parallel.

CATO IVERSON.
WILLIAM A. MAGERKURTH.